(12) United States Patent
Sapiejewski et al.

(10) Patent No.: US 7,916,888 B2
(45) Date of Patent: Mar. 29, 2011

(54) IN-EAR HEADPHONES

(75) Inventors: Roman Sapiejewski, Boston, MA (US);
William W. Tice, Amherst, NH (US);
Jason M. Harlow, Watertown, MA (US); Ian M. Collier, Allston, MA (US);
Kevin P. Annunziato, Medway, MA (US); Pericles Nicholas Bakalos, Maynard, MA (US); Michael J. Monahan, Franklin, MA (US)

(73) Assignee: Bose Corporation, Framingham, MA (US)

( * ) Notice: Subject to any disclaimer, the term of this patent is extended or adjusted under 35 U.S.C. 154(b) by 1214 days.

(21) Appl. No.: 11/428,057

(22) Filed: Jun. 30, 2006

(65) Prior Publication Data

US 2008/0002835 A1    Jan. 3, 2008

(51) Int. Cl.
*H04R 25/00* (2006.01)
(52) U.S. Cl. ......... 381/382; 381/370; 381/371; 381/374
(58) Field of Classification Search .......... 381/370–374, 381/380–382, 182, 162
See application file for complete search history.

(56) References Cited

U.S. PATENT DOCUMENTS

| | | | |
|---|---|---|---|
| 1,893,474 A | | 1/1933 | Lieber |
| 4,058,688 A * | | 11/1977 | Nishimura et al. ........... 381/372 |
| 4,677,679 A | | 6/1987 | Killion |
| 4,870,688 A | | 9/1989 | Voroba et al. |
| 4,878,560 A | | 11/1989 | Scott |
| 4,880,076 A | | 11/1989 | Ahlberg et al. |
| 4,917,504 A | | 4/1990 | Scott et al. |
| 5,327,507 A * | | 7/1994 | Suzuki .......................... 381/370 |
| 5,712,453 A | | 1/1998 | Bungardt et al. |
| 5,761,298 A | | 6/1998 | Davis et al. |
| 5,781,638 A | | 7/1998 | Hosaka et al. |
| 5,887,070 A | | 3/1999 | Iseberg et al. |
| 6,021,195 A | | 2/2000 | Brane et al. |
| RE37,398 E * | | 10/2001 | Nageno ........................ 381/371 |
| 6,320,960 B1 | | 11/2001 | Lathrop, III et al. |
| D478,991 S | | 8/2003 | Dyer et al. |
| RE38,351 E | | 12/2003 | Iseberg et al. |
| 6,688,421 B2 | | 2/2004 | Dyer et al. |

(Continued)

FOREIGN PATENT DOCUMENTS

EP    0825796 A2    2/1998

(Continued)

OTHER PUBLICATIONS

Office Action dated Dec. 21, 2009 for EP 07111157.9-1224.

(Continued)

*Primary Examiner* — Suhan Ni (57) ABSTRACT

An earphone includes a first acoustic chamber including a reactive element and a resistive element in parallel, a second acoustic chamber separated from the first acoustic chamber by an acoustic transducer, and a housing to support the apparatus from the concha of a wearer's ear and to extend the second acoustic chamber into the ear canal of the wearer's ear.
A cushion includes a first material and a second material and is formed into a first region and a second region. The first region defines an exterior surface shaped to fit the concha of a human ear. The second region defines an exterior surface shaped to fit the ear canal of a human ear. The first and second regions together define an interior surface shaped to accommodate an earphone. The first material occupies a volume adjacent to the interior surface. The second material occupies a volume between the first material and the first and second outer surfaces. The first and second materials are of different hardnesses.

25 Claims, 12 Drawing Sheets

U.S. PATENT DOCUMENTS

| | | | |
|---|---|---|---|
| 6,735,316 | B1 | 5/2004 | Wurtz |
| 6,831,984 | B2 | 12/2004 | Sapiejewski |
| 6,922,476 | B2 | 7/2005 | Nassimi |
| 2001/0043707 | A1 | 11/2001 | Leedom |
| 2003/0152244 | A1 | 8/2003 | Dobras et al. |
| 2004/0042625 | A1 | 3/2004 | Brown |
| 2005/0147269 | A1 | 7/2005 | Oliveira et al. |

FOREIGN PATENT DOCUMENTS

| | | |
|---|---|---|
| EP | 1058479 A2 | 12/2000 |
| EP | 1809069 A1 | 7/2007 |
| WO | 9931935 A1 | 6/1999 |
| WO | WO0124579 A2 | 4/2001 |
| WO | WO03069951 A1 | 8/2003 |
| WO | 2007031340 A2 | 3/2007 |
| WO | 2007089845 A2 | 8/2007 |

OTHER PUBLICATIONS

EP Search Report dated Dec. 10, 2008 for EP Appl. No. 07111157.9-1224 / 1874080.

International Search Report and Written Opinion dated Jun. 18, 2008 from International Application No. PCT/US2007/088805.

http://www.sonystyle.com/is-bin/INTERSHOP.enfinity/eCS/Store/en/-/USD/SY_DisplayProductinformation-Start?CategoryName=pa_Headphones_FontopiaEarbud&ProductSKU=MDRED21LP&TabName=specs&var2=, Sony MDR ED21LP.

http://emedia.leeward.hawaii.edu/Frary/sony_mdr-nc10_review.htm, Sony MDR-NC10 Noise Canceling Stereo Headphones.

http://www.plantronics.com/media/media_resources/literature/user_guides/discovery640_ug_en_e.pdf;jsessionid=XIFCOZVIKEJBOCQBGNUCFFAKAEZWSIV0, Plantronics Discovery 640 User Guide, Printed Jun. 2005, pp. 1-18.

http://www.plantronics.com/media/media_resources/literature/cordless_mobile/discovery640_en.pdf;jsessionid=XIFCOZVIKEJBOCQBGNUCFFAKAEZWSIV0, Plantronics Discovery 640 Bluetooth Headset.

http://www.shure.com/PersonalAudio/Products/Earphones/ESeries/us_pa_E500_pth_content, E500PTH Sound Isolating Earphones, Triple Hi-Definition Drivers.

International Report on Patentability dated Jul. 9, 2009 for PCT/US2007/088805.

\* cited by examiner

IN-EAR HEADPHONES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

This description relates to earphones.

Figure 1:
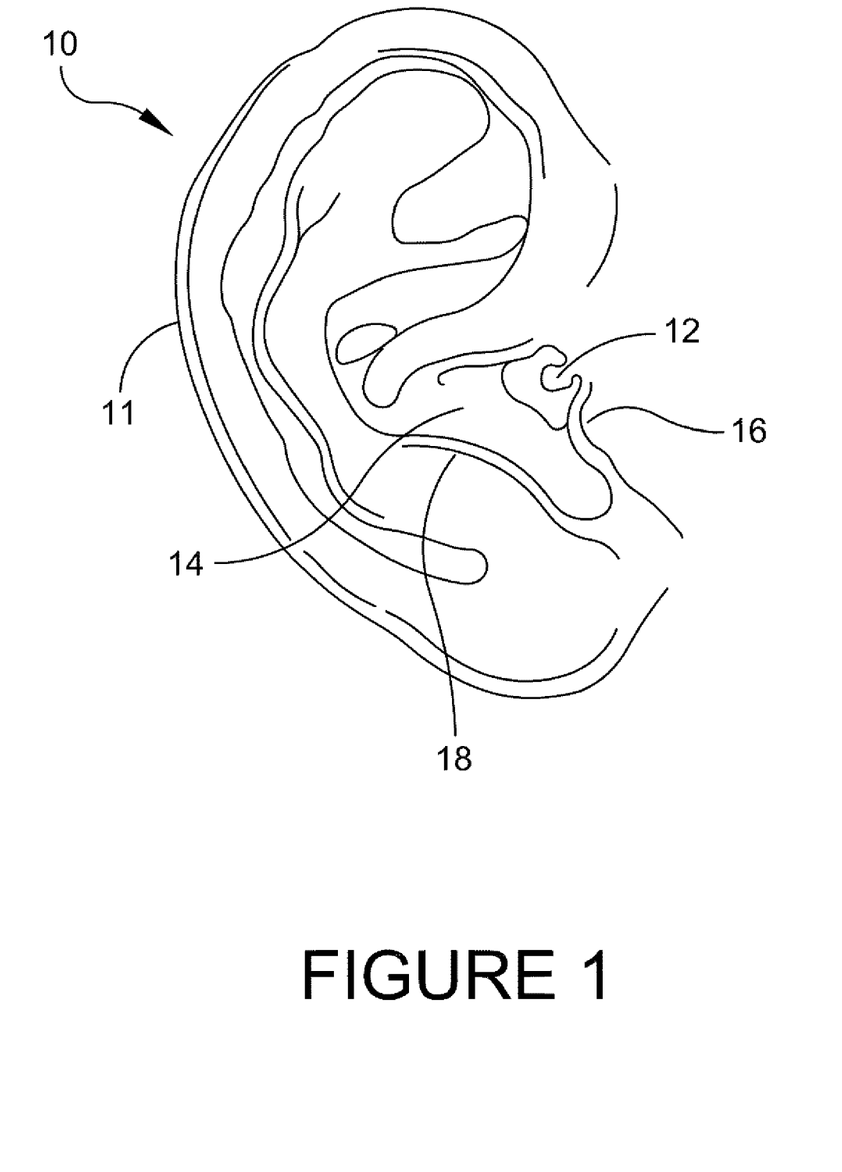
FIG. 1 shows a human ear.

As shown in FIG. 1, a human ear 10 includes an ear canal 12 which leads to the sensory organs (not shown). The pinna 11, the part of the ear outside the head, includes the concha 14, the hollow next to the ear canal 12, defined in part by the tragus 16 and anti-tragus 18. An earphone is generally designed to be worn over the pinna, in the concha, or in the ear canal.

SUMMARY

In general, in one aspect an earphone includes a first acoustic chamber including a reactive element and a resistive element in parallel, a second acoustic chamber separated from the first acoustic chamber by an acoustic transducer, and a housing to support the apparatus from the concha of a wearer's ear and to extend the second acoustic chamber into the ear canal of the wearer's ear.

Implementations may include one or more of the following features.

An acoustic damper is in the second acoustic chamber. The acoustic damper covers an opening in the second acoustic chamber. a portion of the acoustic damper defines a hole. A wall of the second acoustic chamber defines a hole that couples the second acoustic chamber to free space.

A cushion surrounds a portion of the housing to couple the housing to the concha and ear canal of the users ear. The cushion includes an outer region formed of a first material having a first hardness, and an inner region formed of a second material having a second hardness. The first material has a hardness of around 3 shore A to 12 shore A. The first material has a hardness of around 8 shore A. The second material has a hardness of around 30 shore A to 90 shore A. The second material has a hardness of around 40 shore A. A first region of the cushion is shaped to couple the second acoustic chamber to the ear canal, and a second region of the cushion is shaped to retain the apparatus to the ear, the second region not extending into the ear canal. The cushion is removable. A set of cushions of different sizes is included.

The reactive element and the resistive element cause the first acoustic chamber to have a resonance of between around 30 Hz and around 100 Hz. The resistive element includes a resistive port. The reactive element includes a reactive port. The reactive port includes a tube coupling the first acoustic chamber to free space. The reactive port has a diameter of between around 1.0 to around 1.5 mm and a length of between around 10 to around 20 mm. The reactive port has a diameter of around 1.2 mm. The reactive port and the resistive port couple to the first acoustic chamber at about radially opposite positions. The reactive port and the resistive port are positioned to reduce pressure variation on a face of the transducer exposed to the first acoustic chamber. A plurality of reactive or resistive ports are about evenly radially distributed around a center of the acoustic transducer. A plurality of resistive ports are about evenly radially distributed around a center of the acoustic transducer, and the reactive port couples to the first acoustic chamber at about the center of the acoustic transducer. A plurality of reactive ports are about evenly radially distributed around a center of the acoustic transducer, and the resistive port couples to the first acoustic chamber at about the center of the acoustic transducer.

The first acoustic chamber is defined by a wall conforming to a basket of the acoustic transducer. The first acoustic chamber has a volume less than about 0.4 $cm^3$, including volume occupied by the transducer. The first acoustic chamber has a volume less than about 0.2 $cm^3$, excluding volume occupied by the transducer. The second acoustic chamber is defined by the transducer and the housing, the housing defines a first and a second hole, the first hole being at an extremity of the wall extending into the wearer's ear canal, and the second hole being positioned to couple the acoustic chamber to free space when the apparatus is positioned in the wearer's ear; and an acoustic damper is positioned across the first hole and defines a third hole having a smaller diameter than the first hole.

A circuit is included to adjust a characteristic of signals provided to the acoustic transducer. A set of earphones includes a pair of earphones.

In general, in one aspect, a cushion includes a first material and a second material and is formed into a first region and a second region. The first region defines an exterior surface shaped to fit the concha of a human ear. The second region defines an exterior surface shaped to fit the ear canal of a human ear. The first and second regions together define an interior surface shaped to accommodate an earphone. The first material occupies a volume adjacent to the interior surface. The second material occupies a volume between the first material and the first and second outer surfaces. The first and second materials are of different hardnesses.

Implementations may include one or more of the following features. The first material has a hardness in the range of about 3 shore A to about 12 shore A. The first material has a hardness of about 8 shore A. The second material has a hardness in the range of about 30 shore A to about 90 shore A. The first material has a hardness of about 40 shore A.

Other features and advantages will be apparent from the description and the claims.

DETAILED DESCRIPTION

Figure 2A:
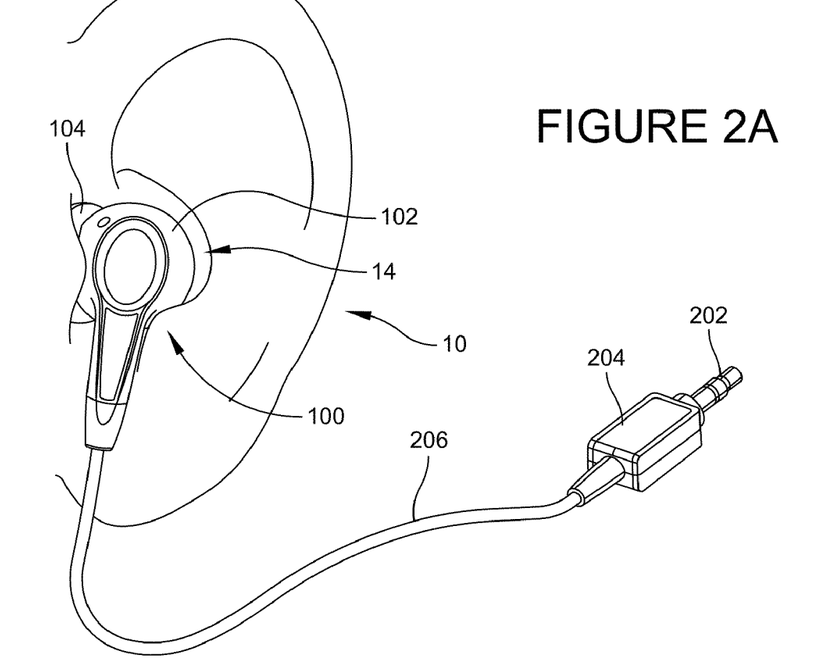
FIG. 2A is a perspective view of an earphone located in the ear.
Figure 2B:
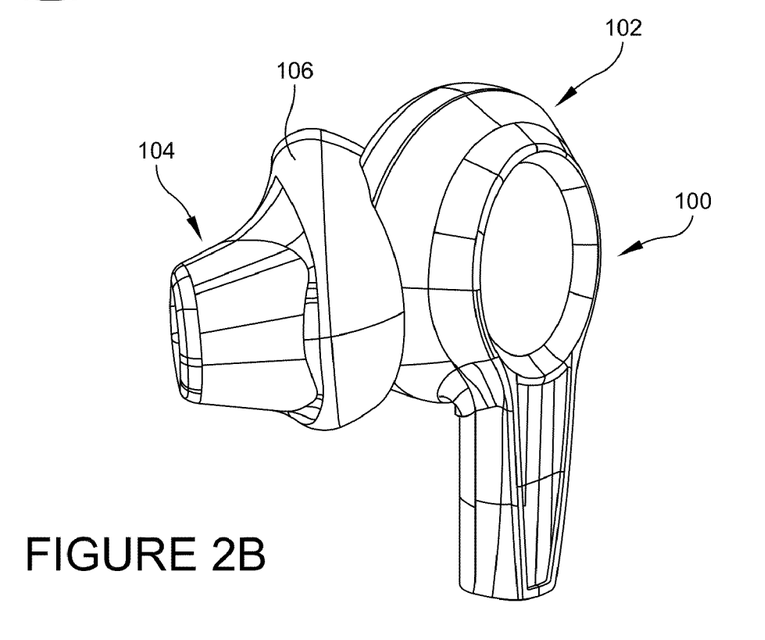
FIG. 2B is an isometric view of an earphone.

As shown in FIGS. 2A and 2B, an earphone 100 has a first region 102 designed to be located in the concha 14 of the wearer's ear 10, and a second region 104 to be located in the ear canal 12. (FIGS. 2A and 2B show a wearer's left ear and corresponding earphone 100. A complementary earphone may fit the right ear, not shown. In some examples, only one earphone is provided. In some examples, a left earphone and a right earphone may be provided together as a pair.) A cushion 106 couples the acoustic components of the earphone to the physical structure of a wearer's ear. A plug 202 connects the earphone to a source of audio signals, such as a CD player, cell phone, MP3 player, or PDA (not shown), or may have multiple plugs (not shown) allowing connection to more than one type of device at a time. A circuit housing 204 may include circuitry for modifying the audio signal, for example, by controlling its volume or providing equalization. The housing 204 may also include switching circuitry, either manual or automatic, for connecting the signals output by one or another of the above mentioned sources to the earphone. A cord 206 conveys audio signals from the source to the earphones. In some examples, the signals may be communicated wirelessly, for example, using the Bluetooth protocol, and the cord 206 would not be included. Alternatively or additionally, a wireless link may connect the circuitry with one or more of the sources.

Figure 3A:
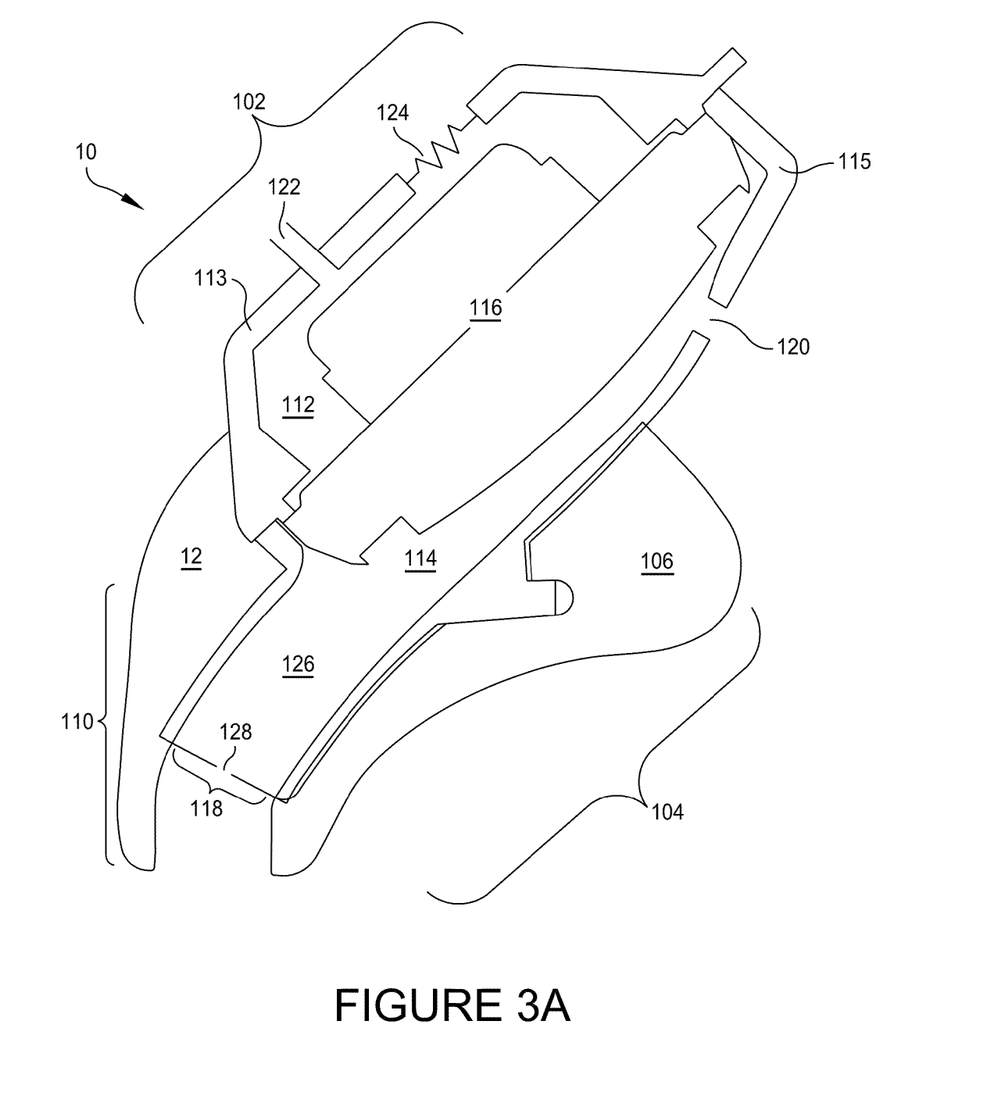
FIG. 3A is a schematic cross section of an earphone.
Figure 3B:
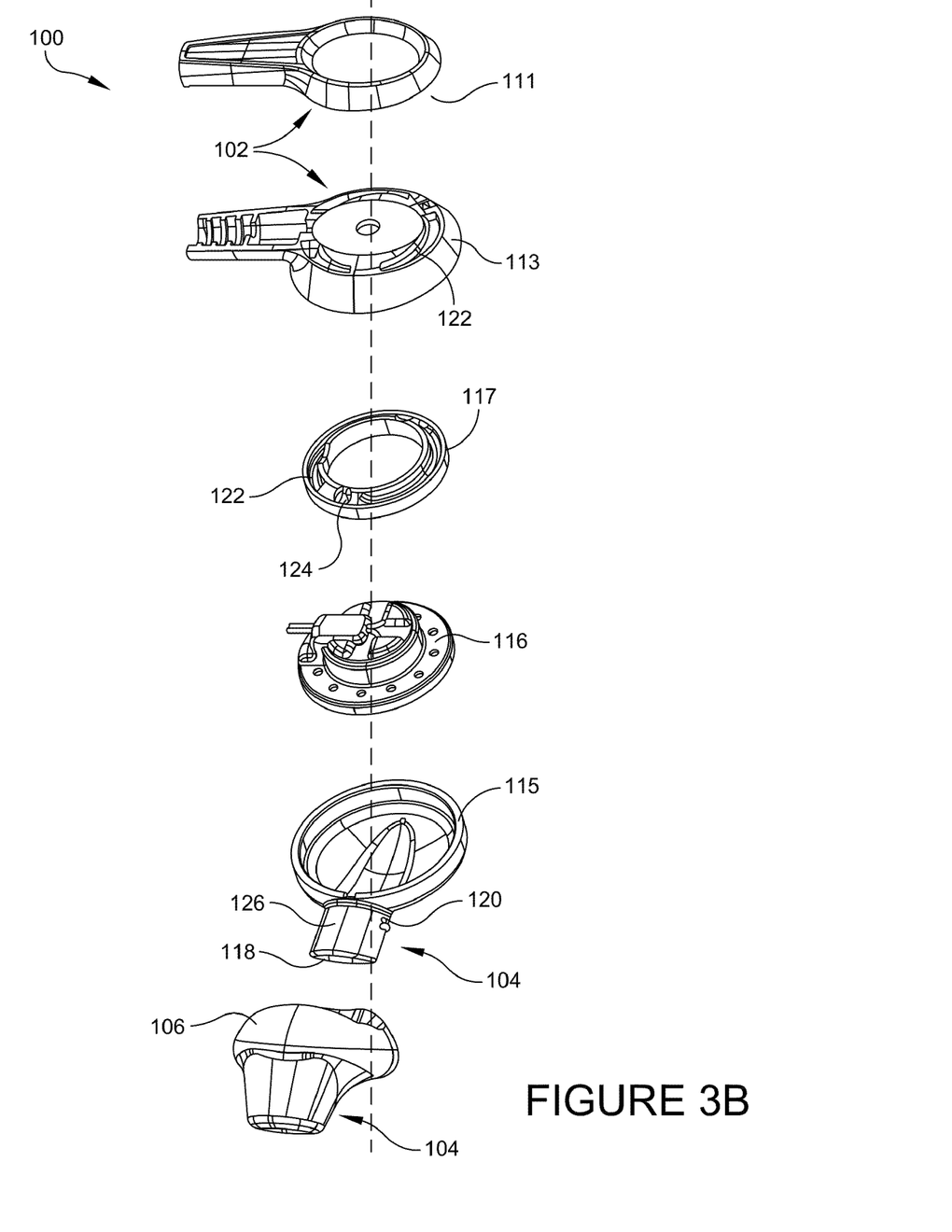
FIG. 3B is an exploded isometric view of an earphone.

As shown in FIGS. 3A and 3B, the first region 102 of the earphone 100 includes a rear chamber 112 and a front chamber 114 defined by shells 113 and 115, respectively, on either side of a driver 116. In some examples, a 16 mm diameter driver is used. Other sizes and types of acoustic transducers could be used depending, for example, on the desired frequency response of the earphone. The front chamber 114 extends (126) to the entrance to the ear canal 12, and in some embodiments into the ear canal 12, through the cushion 106 and ends at acoustic resistance element 118. In some examples, the resistance element 118 is located within the extended portion 126, rather than at the end, as illustrated. An acoustic resistance element dissipates a proportion of acoustic energy that impinges on or passes through it. In some examples, the front chamber 114 includes a pressure equalization (PEQ) hole 120. The PEQ hole 120 serves to relieve air pressure that could be built up within the ear canal 12 and front chamber 114 when the earphone 100 is inserted into the ear 10. The rear chamber 112 is sealed around the back side of the driver 116 by the shell 113. In some examples, the rear chamber 112 includes a reactive element, such as a port (also referred to as a mass port) 122, and a resistive element, which may also be formed as a port 124. U.S. Pat. No. 6,831,984 describes the use of parallel reactive and resistive ports in a headphone device, and is incorporated here by reference. Although we refer to ports as reactive or resistive, in practice any port will have both reactive and resistive effects. The term used to describe a given port indicates which effect is dominant. In the example of FIG. 3B, the reactive port is defined by spaces in an inner spacer 117, the shell 113, and an outer cover 111. A reactive port like the port 122 is, for example, a tube-shaped opening in what may otherwise be a sealed acoustic chamber, in this case rear chamber 112. A resistive port like the port 124 is, for example, a small opening in the wall of an acoustic chamber covered by a material providing an acoustical resistance, for example, a wire or fabric screen, that allows some air and acoustic energy to pass through the wall of the chamber.

Each of the cushion 106, cavities 112 and 114, driver 116, damper 118, hole 120, and ports 122 and 124 have acoustic properties that may affect the performance of the earphone 100. These properties may be adjusted to achieve a desired frequency response for the earphone. Additional elements, such as active or passive equalization circuitry, may also be used to adjust the frequency response.

Figure 4A:
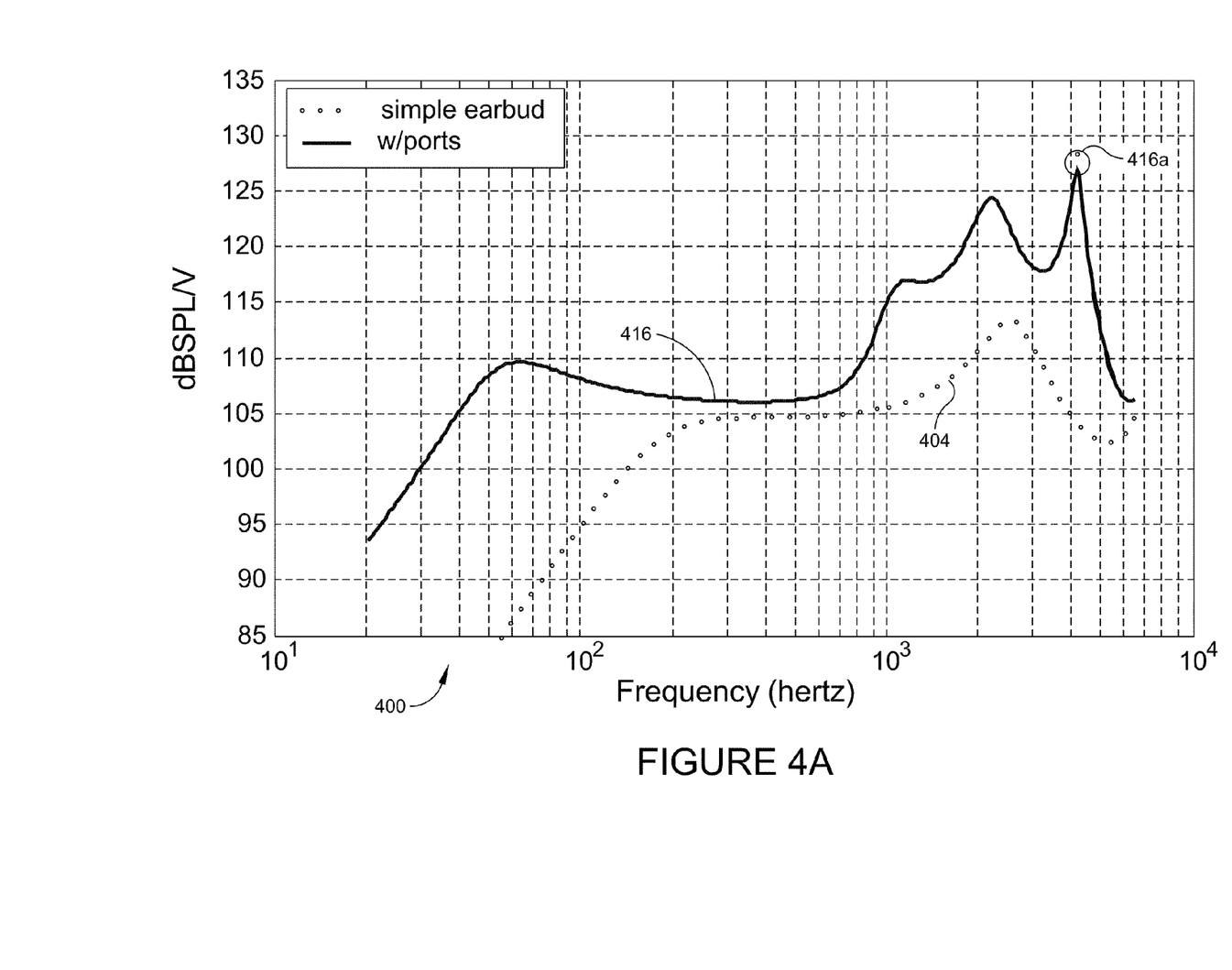
FIGS. 4A-4C and 6 are graphs.

The effects of the cavities 112 and 114 and the ports 122 and 124 are shown by graph 400 in FIG. 4A. The frequency response of a traditional earbud headphone (that is, one that does not extend into the ear canal and does not provide a seal to the ear canal) is shown as curve 404 in FIG. 4A. Traditional ear bud designs have less low frequency response than may be desired, as shown by section 404a, which shows decreased response below around 200 Hz. To increase low frequency response and sensitivity, a structure 126, sometimes referred to as a nozzle, may extend the front cavity 112 into the ear canal, facilitating the formation of a seal between the cushion 106 and the ear canal. Sealing the front cavity 114 to the ear canal decreases the low frequency cutoff, as does enclosing the rear of transducer 116 with small cavity 112 including the ports 122 and 124. Together with a lower portion 110 of the cushion, the nozzle 126 provides better seal to the ear canal than earphones that merely rest in the concha, as well as a more consistent coupling to the user's ears, which reduces variation in response among users. The tapered shape and pliability of the cushion allow it to form a seal in ears of a variety of shapes and sizes. The nozzle and cushion design is described in more detail below.

In some examples, the rear chamber 112 has a volume of 0.28 cm$^3$, which includes the volume of the driver 116. Excluding the driver, the rear chamber 112 has a volume of 0.08 cm$^3$. An even smaller rear chamber may be formed by simply sealing the rear surface of the driver 116 (e.g., sealing the basket of a typical driver, see the cover 702 in FIG. 7A). Other earbud designs often have rear cavities of at least 0.7 cm$^3$, including 0.2 cm$^3$ for the driver.

The reactive port 122 resonates with the back chamber volume. In some examples, it has a diameter in the range of about 1.0-1.5 mm and a length in the range of about 10-20 mm long. In some embodiments, the reactive port is tuned to resonate with the cavity volume around the low frequency cutoff of the earphone. In some embodiments, this is in the low frequency range between 30 Hz and 100 Hz. In some examples, the reactive port 122 and the resistive port 124 provide acoustical reactance and acoustical resistance in parallel, meaning that they each independently couple the rear chamber 112 to free space. In contrast, reactance and resistance can be provided in series in a single pathway, for example, by placing a resistive element such as a wire mesh screen inside the tube of a reactive port. In some examples, a parallel resistive port is made from a 70×088 Dutch twill wire cloth, for example, that available from Cleveland Wire of Cleveland, Ohio, and has a diameter of about 3 mm. Parallel reactive and resistive elements, embodied as a parallel reactive port and resistive port, provides increased low frequency response compared to an embodiment using a series reactive and resistive elements. The parallel resistance does not substantially attenuate the low frequency output while the series resistance does. The frequency response of an earphone having a combination of a small back chamber with parallel reactive and resistive ports and a front chamber with a nozzle is shown by curve 416 in FIG. 4A. Using a small rear cavity with parallel ports allows the earphone to have improved low frequency output and a desired balance between low frequency and high frequency output. Various design options for the ports are discussed below.

High frequency resonances in the front chamber structure, for example, those represented by peaks 416a, can be damped by placing an acoustical resistance (sometimes referred to as a damper or acoustical damper), element 118 in FIGS. 3A and 3B, in series with the output of the nozzle 126, as shown in FIG. 3A. In some examples, a stainless steel wire mesh screen of 70×800 Dutch twill wire cloth is used. In some examples, a small hole 128 is formed in the center of the screen 118. In some examples, the screen 118 is about 4 mm in diameter, and the hole is about 1 mm. Other sizes may be appropriate for other nozzle geometries or other desired frequency responses. The hole 128 in the center of the screen 118 slightly lowers the acoustical resistance of the screen 118, but does not block low frequency volume velocity significantly, as can be seen in region 422a of curve 422. The curve 416 is repeated from FIG. 4A, showing the effects of an undamped nozzle and small back chamber with reactive and resistive ports in parallel. Curve 422 has substantially more low frequency output than curve 418a, which shows the effects of a damper 118 without a hole. A screen with a hole in it provides damping of the higher frequency resonances (compare peaks 422b to peaks 416a), though not as much as a screen without a hole (compare peaks 422b to peaks 418b), but substantially increases low frequency output, nearly returning it to the level found without the damper.

Figure 4B:
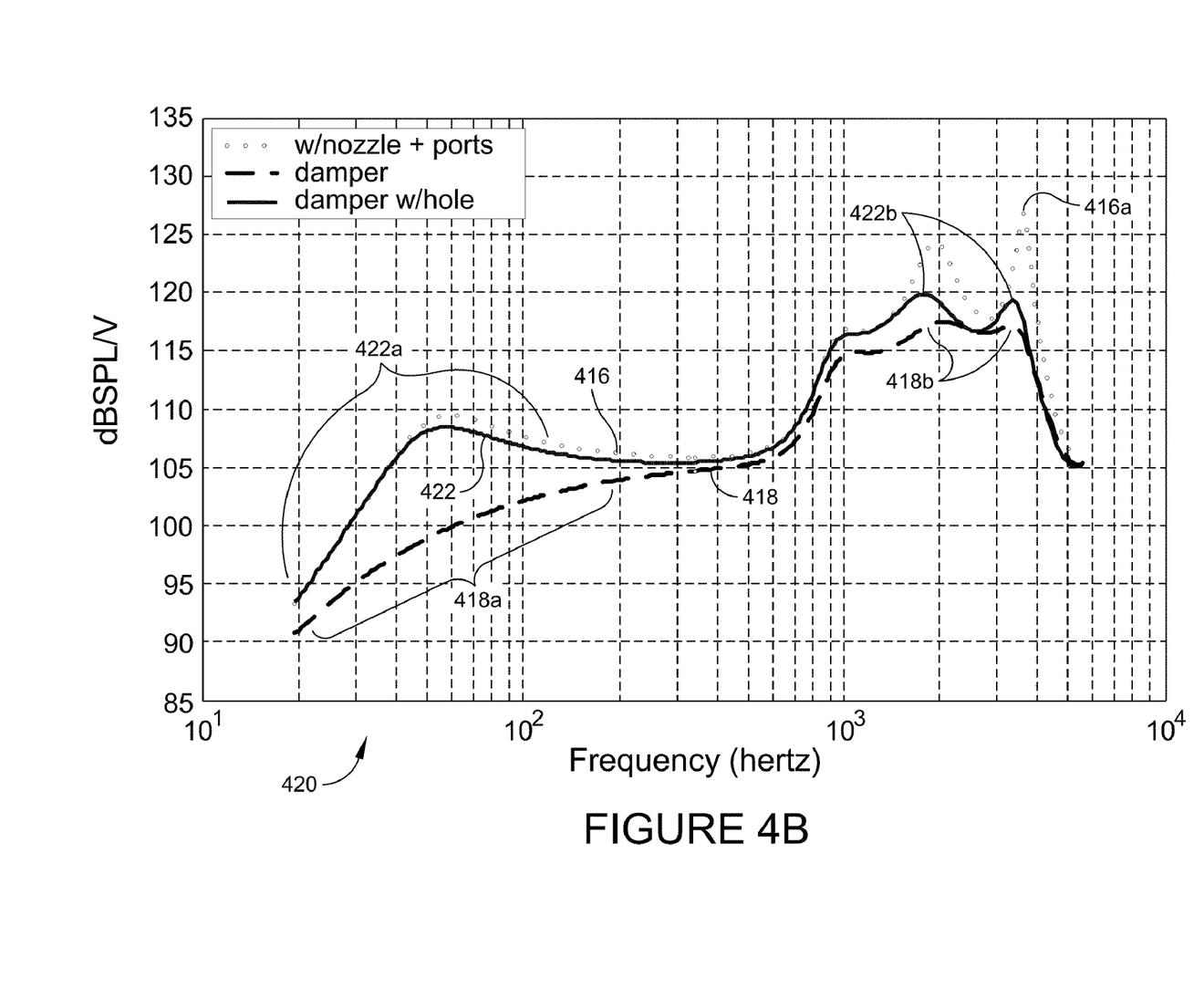
Figure 4C:
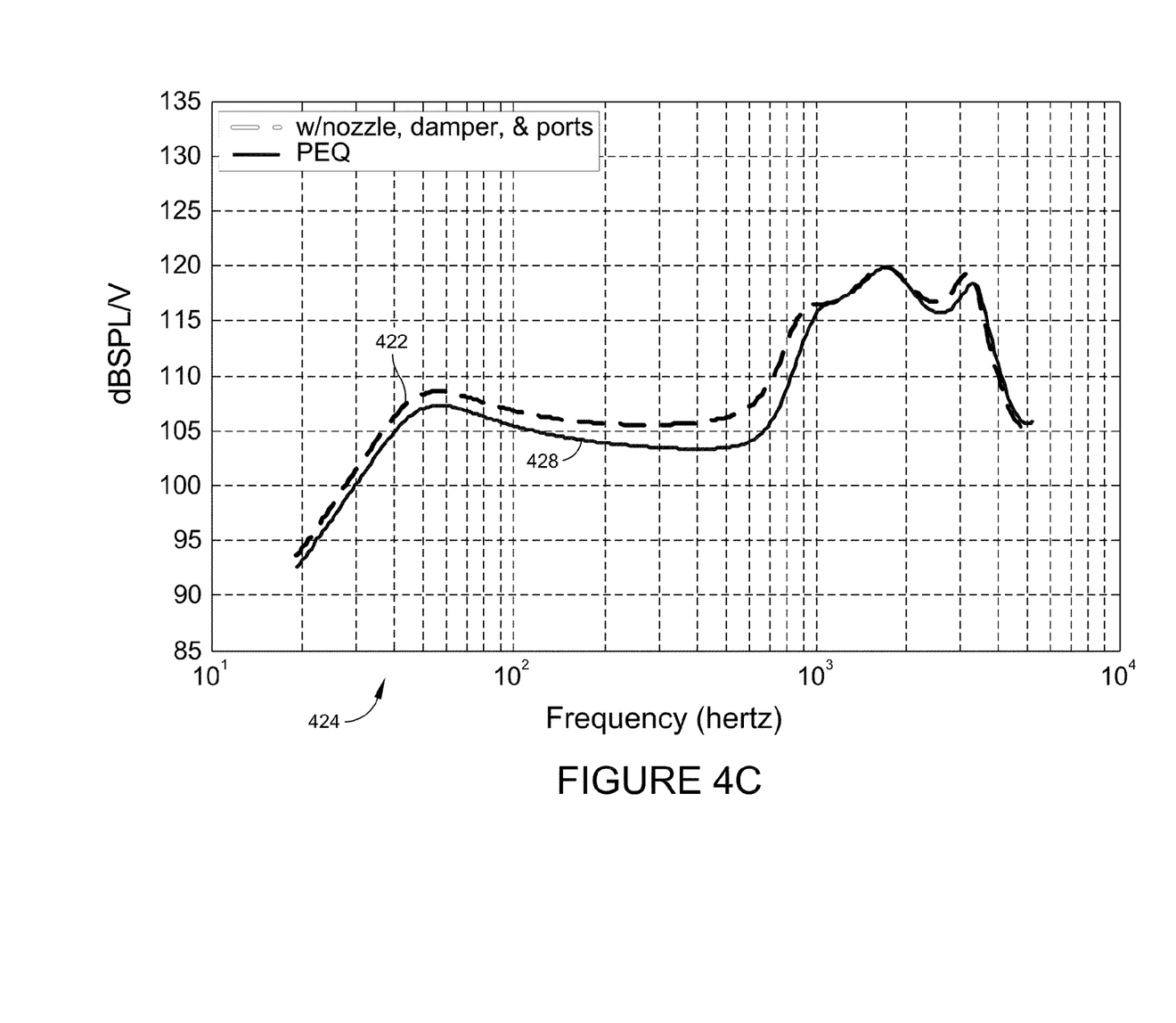

The PEQ hole 120 is located so that it will not be blocked when in use. For example, the PEQ hole 120 is not located in the cushion 106 that is in direct contact with the ear, but away from the ear in the front chamber 114. The primary purpose of the hole is to avoid an over-pressure condition when the earphone 100 is inserted into the user's ear 10. Additionally, the hole can used to provide a fixed amount of leakage that acts in parallel with other leakage that may be present. This helps to standardize response across individuals. In some examples, the PEQ hole 120 has a diameter of about 0.50 mm. Other sizes may be used, depending on such factors as the volume of the front chamber 114 and the desired frequency response of the earphones. The frequency response effect of the known leakage through the PEQ hole 120 is shown by a graph 424 in FIG. 4C. Curve 422 is repeated from FIG. 4B, showing the response with the other elements (small rear chamber with parallel reactive and resistive ports, front chamber with nozzle, and screen damper with small hole in center across nozzle opening) but without the PEQ hole 120, while curve 428 shows the response with the PEQ hole providing a known amount of leakage. Adding the PEQ hole makes a trade off between some loss in low frequency output and more repeatable overall performance.

Figure 5:
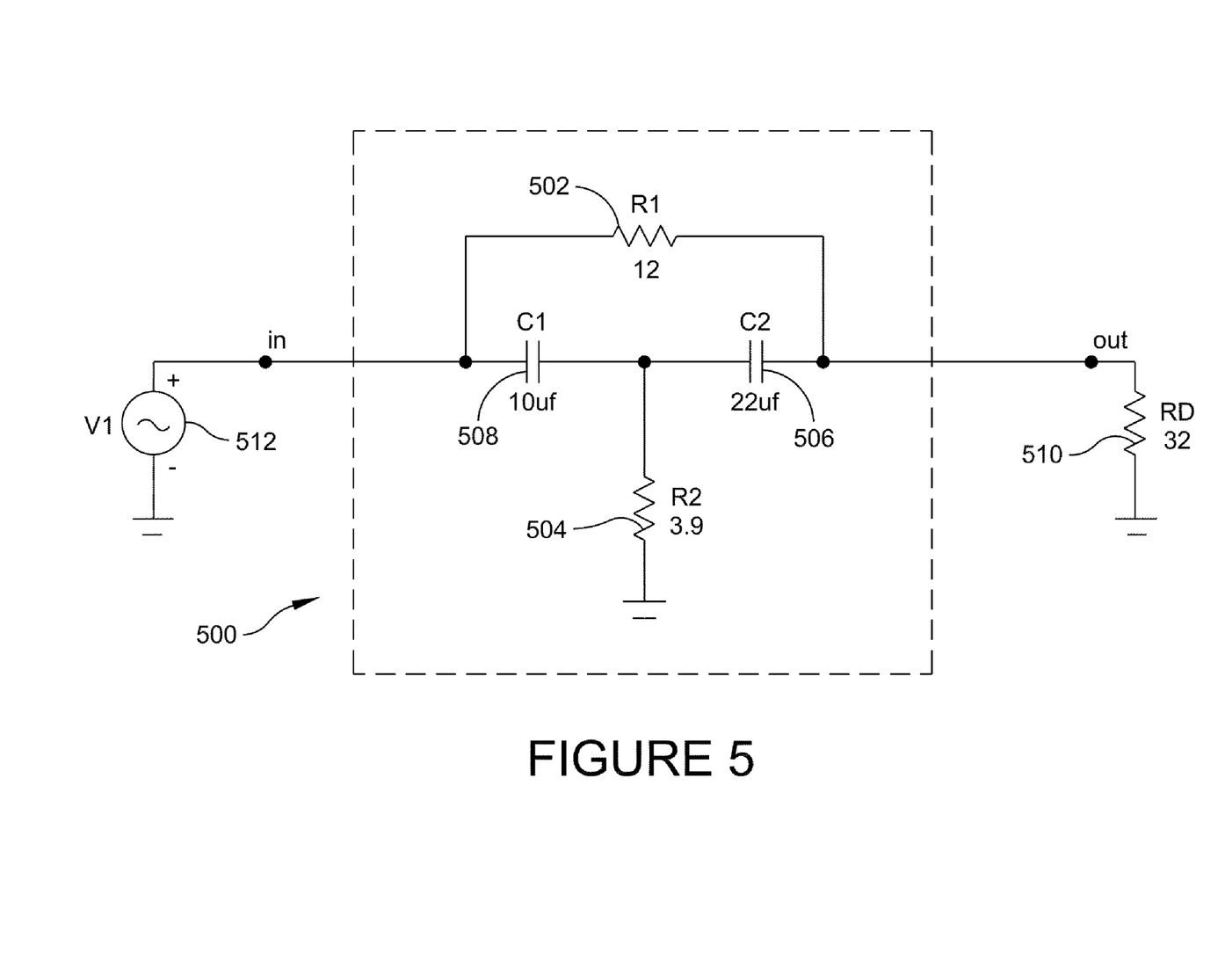
FIG. 5 is a circuit diagram.
Figure 6:
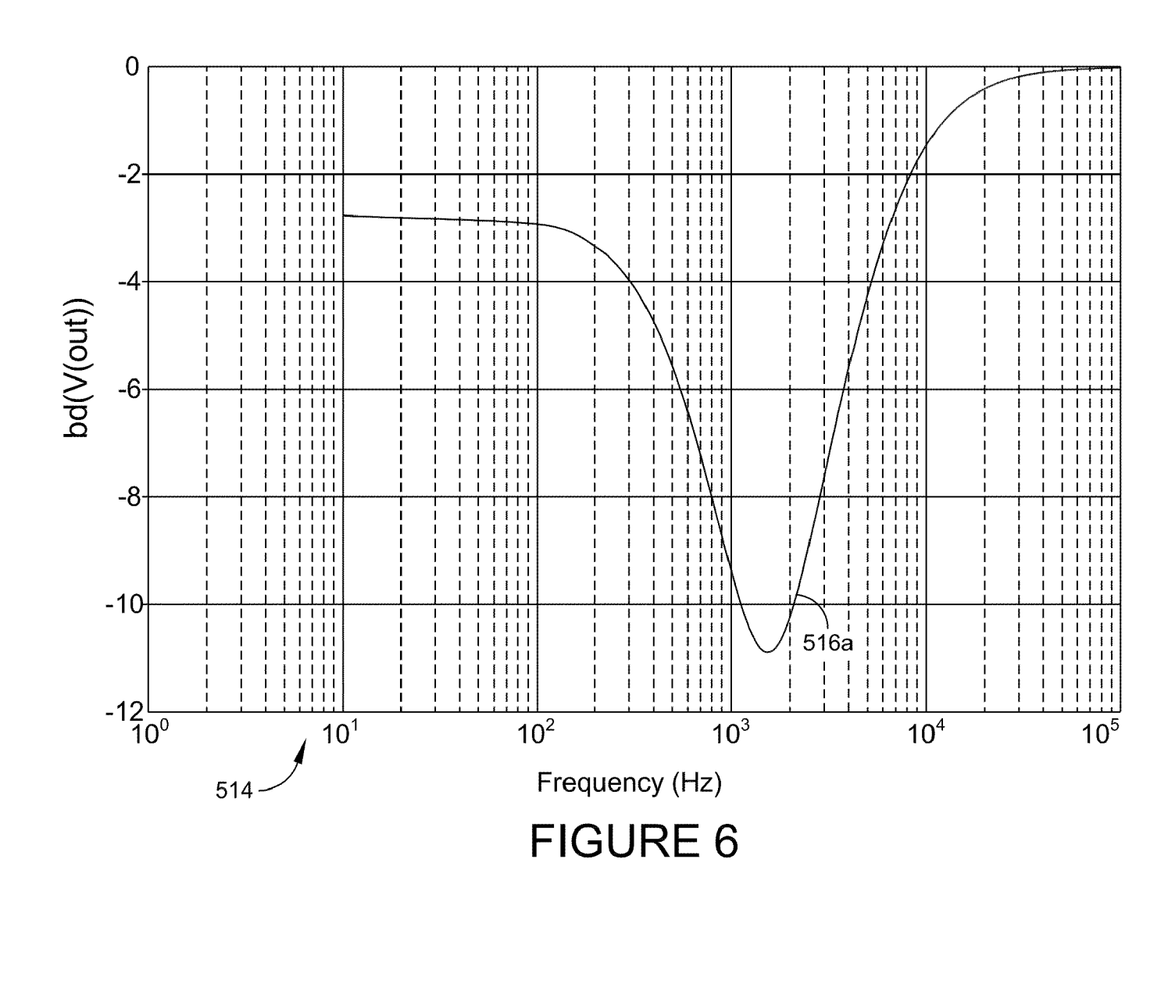

Some or all of the elements described above can be used in combination to achieve a particular frequency response (non-electronically). In some examples, additional frequency response shaping may be used to further tune sound reproduction of the earphones. One way to accomplish this is passive electrical equalization using circuitry like that shown in FIG. 5. For example, if a resonance remained at 1.55 KHz after tuning the acoustic components of the earphones, a passive equalization circuit 500 including resistors 502 and 504 and capacitors 506 and 508 connected as indicated may be used. In circuit 500, the output resistance 510 represents the nominal 32 ohm electrical impedance of standard earphones, and the input voltage source 512 represents the audio signal input to the headphones, for example, from a CD player. Graph 514 in FIG. 6 shows the electrical frequency response curve 516 that results from circuit 500, indicating a dip 516a in response at 1.55 KHz corresponding to a Q factor of 0.75, with an 8 db decrease in output voltage at the dip frequency compared to the response at low frequencies. The actual values of the resistors and capacitors, and the resulting curve, will depend on the specific equalization needs based on the details of the acoustic components of the earphone. Such circuitry can be housed in-line with the earphones, for example, inside the circuit housing 204 (FIG. 2A).

Figure 7A:
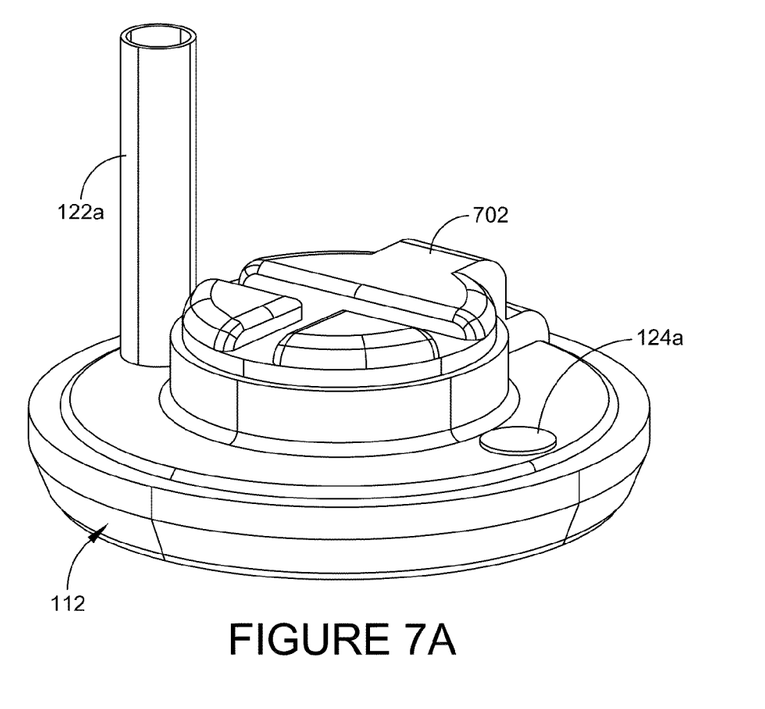
FIGS. 7A-7D are isometric views of portions of an earphone.
Figure 7B:
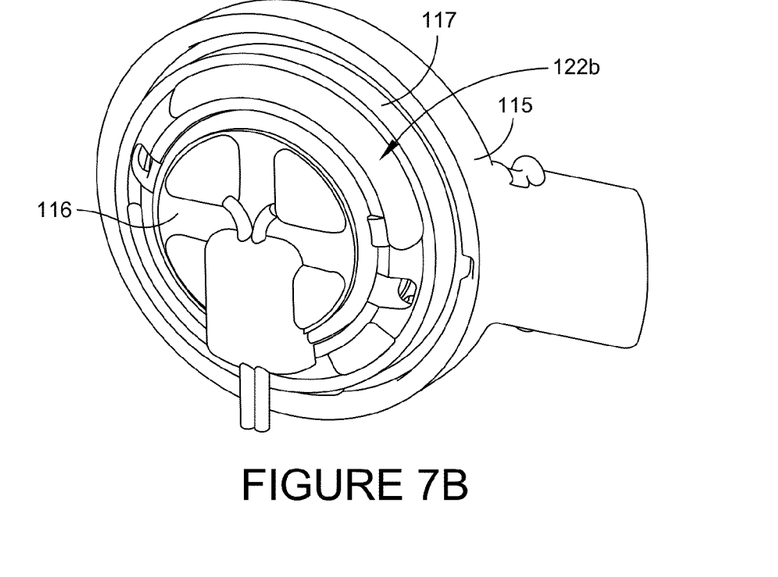
Figure 7C:
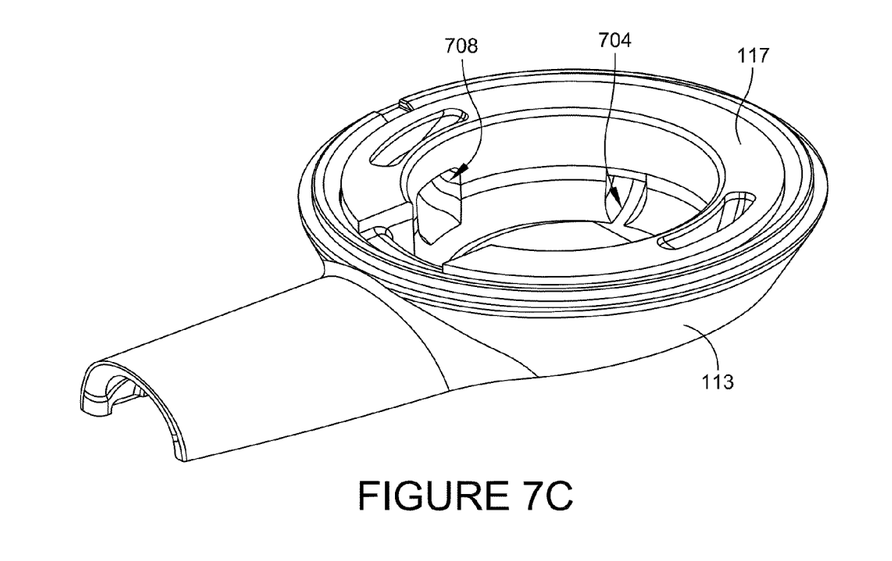
Figure 7D:
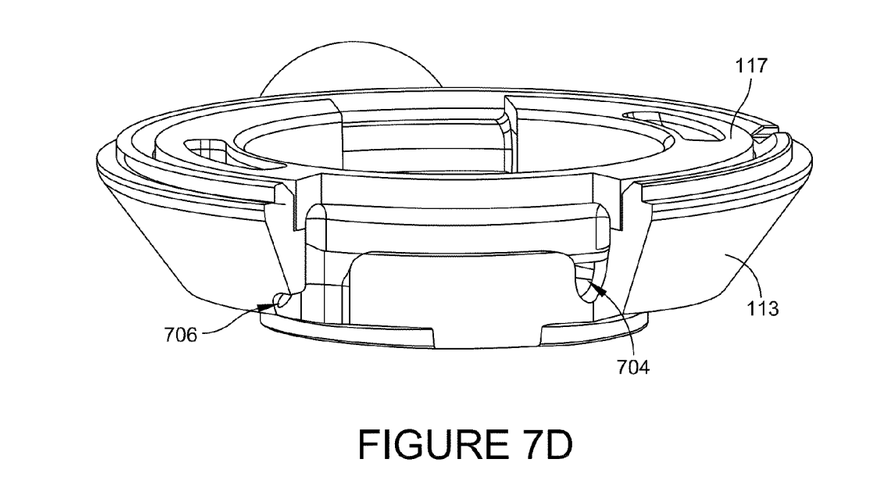
Figure 8A:
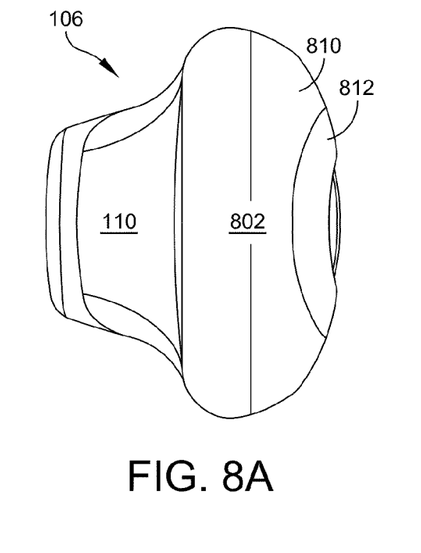
FIGS. 8A and 8B are side views of a cushion.
Figure 8B:
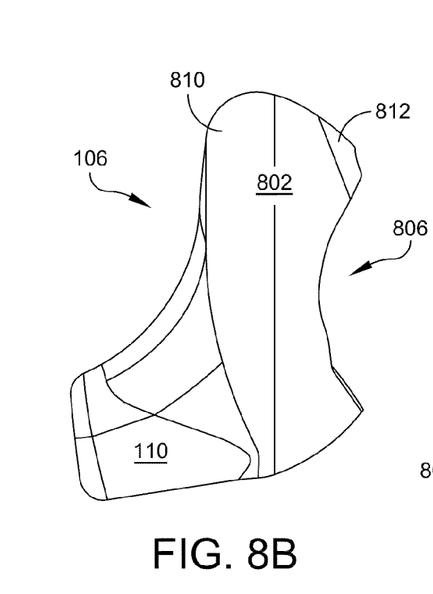
Figure 8C:
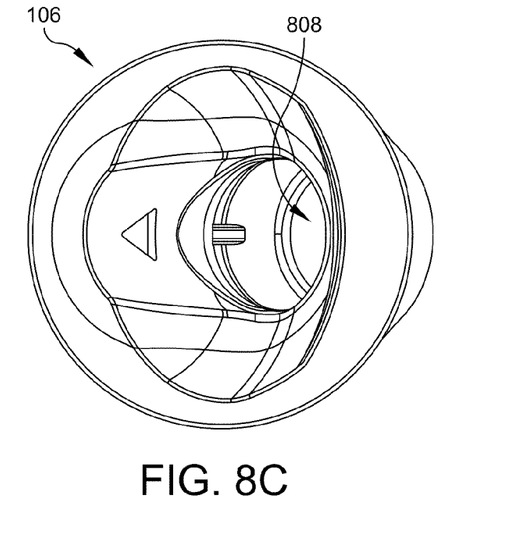
FIG. 8C is a top view of a cushion.
Figure 8D:
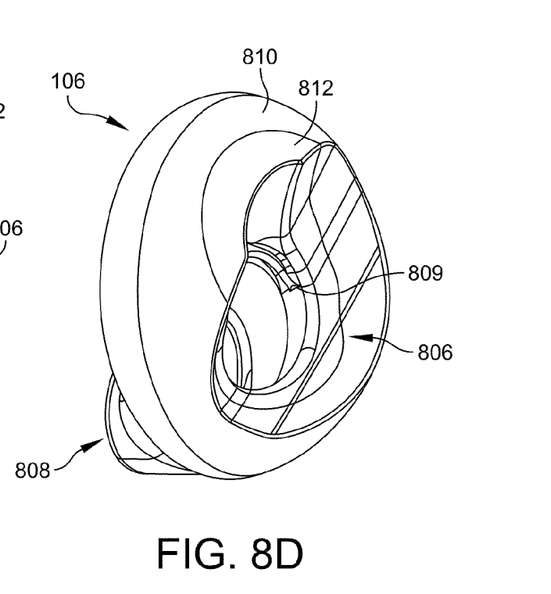
FIG. 8D is an isometric view of a cushion.

Options for the design of the ports 122 and 124 are shown in FIGS. 7A-7D. As shown in FIG. 7A, a reactive port 122a extends out from the back cover 702 of the rear chamber 112. A resistive port 124a is located on the opposite side of the cover 702. Such a reactive port could be bent or curved to provide a more compact package, as shown by a curved port 122b formed in the inner spacer 117 in FIG. 7B. In some examples, as shown in FIGS. 3B, 7C, and 7D, the full tube of the port is formed by the assembly of the inner spacer 117 with the outer shell 113, which also may form the outer wall of the rear chamber 112. In the example of FIGS. 7C and 7D, an opening 704 in the inner spacer 117 is the beginning of the port 122. The port curves around the circumference of the earphone to exit at an opening 706 in the outer shell 113. A portion of the shell 113 is cut away in FIG. 7D so that the beginning opening 704 can be seen. FIG. 7C also shows an opening 708 for the resistive port 124. In some examples, arranging ports symmetrically around the rear chamber 112 as shown in FIG. 7A has advantages, for example, it helps to balance pressure differences across the rear chamber 112 (which would appear across the back of the diaphragm of the driver 116, FIG. 7B) that could otherwise occur. Pressure gradients across the driver diaphragm could induce rocking modes. Some examples may use more than one reactive port or resistive port, or both types of ports, evenly radially distributed around the rear chamber 112. A single resistive port (or single reactive port) could be centrally located, with several reactive (or resistive) ports evenly distributed around it.

The cushion 106 is designed to comfortably couple the acoustic elements of the earphone to the physical structure of the wearer's ear. As shown in FIGS. 8A-8D, the cushion 106 has an upper portion 802 shaped to make contact with the tragus 16 and anti-tragus 18 of the ear (see FIGS. 1 and 2A), and a lower portion 110 shaped to enter the ear canal 12, as mentioned above. In some examples, the lower portion 110 is shaped to fit within but not apply significant pressure on the flesh of the ear canal 12. The lower portion 110 is not relied upon to provide retention of the earphone in the ear, which allows it to seal to the ear canal with minimal pressure. A void 806 in the upper portion 802 receives the acoustic elements of the earphone (not shown), with the nozzle 126 (FIG. 3) extending into a void 808 in the lower portion 110. In some examples, the cushion 106 is removable from the earphone 100, and cushions of varying external size may be provided to accommodate wearers with different-sized ears. In some examples, the cushion 106 is formed of materials having different hardnesses, as indicated by regions 810 and 812. The outer region 810 is formed of a soft material, for example, one having a durometer of 8 shore A, which provides good comfort because of its softness. Typical durometer ranges for this section are from 3 shore A to 12 shore A. The inner region 812 is formed from a harder material, for example, one having a durometer of 40 shore A. This section provides the stiffness needed to hold the cushion in place. Typical durometer ranges for this section are from 30 shore A to 90 shore A. In some examples, the inner section 812 includes an O-ring type retaining collar 809 to retain the cushion on the acoustic components. The stiffer inner portion 812 may also extend into the outer section to increase the stiffness of that section. In some examples, variable hardness could be arranged in a single material.

In some examples, both regions of the cushion are formed from silicone. Silicone can be fabricated in both soft and more rigid durometers in a single part. In a double-shot fabrication process, the two sections are created together with a strong bond between them. Silicone has the advantage of maintaining its properties over a wide temperature range, and is known for being successfully used in applications where it remains in contact with human skin. Silicone can also be fabricated in different colors, for example, for identification of different sized cushions, or to allow customization. In some examples, other materials may be used, such as thermoplastic elastomer (TPE). TPE is similar to silicone, and may be less expensive, but is less resistant to heat. A combination of materials may be used, with a soft silicone or TPE outer section 812 and a hard inner section 810 made from a material such as ABS, polycarbonate, or nylon. In some examples, the entire cushion may be fabricated from silicone or TPE having a single hardness, representing a compromise between the softness desired for the outer section 812 and the hardness needed for the inner section 810.

Other embodiments are within the scope of the following claims.

The invention claimed is:

1. An apparatus comprising:
a first acoustic chamber including a reactive element and a resistive element in parallel,
a second acoustic chamber separated from the first acoustic chamber by an acoustic transducer, and
a housing to support the apparatus from the concha of a wearer's ear and extend into the ear canal of the wearer's ear,
wherein the reactive and resistive elements couple the first acoustic chamber to free space when the second acoustic chamber is coupled to the wearer's ear.

2. The apparatus of claim 1 also comprising an acoustic damper in the second acoustic chamber.

3. The apparatus of claim 2 in which the acoustic damper covers an opening in the second acoustic chamber.

4. The apparatus of claim 2 in which a portion of the acoustic damper defines a hole.

5. The apparatus of claim 1 in which a wall of the second acoustic chamber defines a hole that couples the second acoustic chamber to free space.

6. The apparatus of claim 1 also comprising a cushion surrounding a portion of the housing to couple the housing to the concha and ear canal of the users ear.

7. The apparatus of claim 6 in which the cushion comprises an outer region formed of a first material having a first hardness, and an inner region formed of a second material having a second hardness.

8. The apparatus of claim 7 in which the first material has a hardness of around 3 shore A to 12 shore A.

9. The apparatus of claim 8 in which the first material has a hardness of around 8 shore A.

10. The apparatus of claim 7 in which the second material has a hardness of around 30 shore A to 90 shore A.

11. The apparatus of claim 9 in which the second material has a hardness of around 40 shore A.

12. The apparatus of claim 6 in which a first region of the cushion is shaped to couple the second acoustic chamber to the ear canal, and in which a second region of the cushion is shaped to retain the apparatus to the ear, the second region not extending into the ear canal.

13. The apparatus of claim 6 in which the cushion is removable.

14. The apparatus of claim 13 also comprising a set of cushions of different sizes.

15. The apparatus of claim 1 in which the reactive element and the resistive element cause the first acoustic chamber to have a resonance of between around 30 Hz and around 100 Hz.

16. The apparatus of claim 1 in which the resistive element comprises a resistive port.

17. The apparatus of claim 1 in which the reactive element comprises a reactive port.

18. The apparatus of claim 17 in which the reactive port has a diameter of between around 1.0 to around 1.5 mm and a length of between around 10 to around 20 mm.

19. The apparatus of claim 17 in which the reactive port has a diameter of around 1.2 mm.

20. The apparatus of claim 1 in which the reactive port and the resistive port are positioned to reduce pressure variation on a face of the transducer exposed to the first acoustic chamber.

21. The apparatus of claim 1 in which the first acoustic chamber is defined by a wall conforming to a basket of the acoustic transducer.

22. The apparatus of claim 1 in which the first acoustic chamber has a volume less than about 0.4 cm3, including volume occupied by the transducer.

23. The apparatus of claim 1 in which the first acoustic chamber has a volume less than about 0.2 cm3, excluding volume occupied by the transducer.

24. The apparatus of claim 1 in which
the second acoustic chamber is defined by the transducer and the housing,
the housing defines a first and a second hole,
the first hole being at an extremity of the wall extending into the wearer's ear canal, and
the second hole being positioned to couple the second acoustic chamber to free space when the apparatus is positioned in the wearer's ear; and
an acoustic damper is positioned across the first hole and defines a third hole having a smaller diameter than the first hole.

25. A set of earphones comprising a pair of apparatuses according to claim 1.

* * * * *